(12) United States Patent
Guo et al.

(10) Patent No.: US 8,442,031 B2
(45) Date of Patent: May 14, 2013

(54) METHOD AND APPARATUS FOR UTILIZING NETWORK SERVICES IN A MANNER SUBSTANTIALLY TRANSPARENT TO SERVICE ENDPOINTS

(75) Inventors: Katherine H. Guo, Eatontown, NJ (US); Sarit Mukherjee, Morganville, NJ (US); Kumar Venkata Vemuri, Naperville, IL (US)

(73) Assignee: Alcatel Lucent, Paris (FR)

( * ) Notice: Subject to any disclaimer, the term of this patent is extended or adjusted under 35 U.S.C. 154(b) by 1189 days.

(21) Appl. No.: 11/165,850

(22) Filed: Jun. 24, 2005

(65) Prior Publication Data

US 2006/0291472 A1   Dec. 28, 2006

(51) Int. Cl.
*H04L 12/66* (2006.01)
*H04L 12/28* (2006.01)
*H04J 3/16* (2006.01)

(52) U.S. Cl.
USPC ........ 370/352; 370/395.5; 370/389; 370/401; 370/466

(58) Field of Classification Search ........................ None
See application file for complete search history.

(56) References Cited

U.S. PATENT DOCUMENTS

| 5,274,635 | A  | * | 12/1993 | Rahman et al. | 370/352 |
|---|---|---|---|---|---|
| 6,141,345 | A  | * | 10/2000 | Goeddel et al. | 370/389 |
| 6,674,745 | B1 | * | 1/2004 | Schuster et al. | 370/352 |
| 6,738,390 | B1 | * | 5/2004 | Xu et al. | 370/467 |
| 6,898,186 | B2 | * | 5/2005 | Doty et al. | 370/244 |
| 6,963,556 | B1 | * | 11/2005 | Goldman et al. | 370/352 |
| 7,257,109 | B2 | * | 8/2007 | Sylvain | 370/352 |
| 7,359,373 | B2 | * | 4/2008 | Kuusinen et al. | 370/352 |
| 7,477,638 | B1 | * | 1/2009 | Kumar et al. | 370/356 |
| 2002/0064164 | A1 | * | 5/2002 | Barany et al. | 370/401 |
| 2003/0204608 | A1 | | 10/2003 | Isomaki | |
| 2004/0085949 | A1 | | 5/2004 | Partanen et al. | |

(Continued)

FOREIGN PATENT DOCUMENTS

| EP | 1 545 085 A | 6/2005 |
|---|---|---|
| WO | WO 02/39770 A | 5/2002 |
| WO | WO 03099648 A1 | 12/2003 |
| WO | WO2004/112335 A1 | 12/2004 |

OTHER PUBLICATIONS

International Search Report in corresponding PCT/US2006/023079, Nov. 22, 2006, Lucent Technologies Inc.

(Continued)

*Primary Examiner* — Brandon Renner
(74) *Attorney, Agent, or Firm* — Wall & Tong, LLP

(57) ABSTRACT

The invention includes a method and apparatus for regenerative signaling. Specifically, the method includes receiving at least one base protocol message formatted in accordance with at least one base protocol, obtaining service information associated with at least one network service, and generating, in response to the at least one base protocol message, at least one companion protocol message formatted in accordance with at least one companion protocol. The at least one base protocol message is associated with at least one service endpoint. The service information associated with at least one network service is obtained using the at least one base protocol message. The at least one companion protocol message is generated using at least a portion of the service information. The at least one companion protocol message is operable for controlling the at least one network service in a manner substantially transparent to the at least one service endpoint.

24 Claims, 6 Drawing Sheets

U.S. PATENT DOCUMENTS

| | | | |
|---|---|---|---|
| 2004/0120505 A1* | 6/2004 | Kotzin et al. | 379/373.01 |
| 2004/0184432 A1 | 9/2004 | Gateva et al. | |
| 2004/0205777 A1* | 10/2004 | Zalenski et al. | 719/320 |
| 2004/0240399 A1* | 12/2004 | Corrao et al. | 370/260 |
| 2005/0083912 A1* | 4/2005 | Afshar et al. | 370/352 |
| 2005/0091407 A1* | 4/2005 | Vaziri et al. | 709/246 |
| 2005/0220139 A1* | 10/2005 | Aholainen | 370/466 |
| 2006/0212511 A1* | 9/2006 | Garcia-Martin | 709/203 |
| 2006/0221838 A1* | 10/2006 | Hartoin et al. | 370/242 |
| 2006/0294112 A1* | 12/2006 | Mandato et al. | 707/100 |

OTHER PUBLICATIONS

Lucent Technologies: "IP Multimedia Subsystem (IMS) Service Architecture" White Paper, [Online] Jan. 23, 2004, pp. 1-12, XP002407116 Retrieved from the Internet: URL:http://www.lucent.com/knowledge/documentdetail/0,1983,inContentId+1,00.html.

Montes H et al: "Deployment of IP Multimedia Streaming Services in Third-Generation Mobile Networks" IEEE Wireless Communications, IEEE Service Center, Piscataway, NJ, US, vol. 9, No. 5, Oct. 2002, pp. 84-92, XP001132260 ISSN: 1536-1284.

* cited by examiner

200

300

400

500

METHOD AND APPARATUS FOR UTILIZING NETWORK SERVICES IN A MANNER SUBSTANTIALLY TRANSPARENT TO SERVICE ENDPOINTS

FIELD OF THE INVENTION

The invention relates to the field of communication networks and, more specifically, to utilization of network-based services.

BACKGROUND OF THE INVENTION

In general, in order to access network-based services (e.g., quality of service control, user profile management, and the like) in an IP multimedia subsystem (IMS) network, the signaling required to establish a bearer path must traverse associated call session control functions (CSCFs). As such, since CSCFs operate as session initiation protocol (SIP) proxies, the signaling required to establish the bearer path must be performed using SIP. For example, in order to access streaming video content within IMS at a guaranteed QOS, a SIP user agent (SIP-UA) (e.g., a mobile phone) establishes a connection with a video server using SIP. The video server then streams the video content to the mobile phone using real-time protocol (RTP).

Unfortunately, this existing mechanism for accessing streaming video content and obtaining like network-based services requires SIP-UA integration into the service endpoints (e.g., mobile phones, video servers, and the like), cannot provide VCR capabilities, and prevents the use of third-party client software and third-party server software. Furthermore, wireless terminals supporting real-time streaming protocol (RTSP) applications are incapable of utilizing network-based services controlled by other protocols (e.g., SIP) since the RTSP signaling path does not traverse network components (e.g., CSCFs) required for accessing network-based services controlled by such other protocols.

SUMMARY OF THE INVENTION

Various deficiencies in the prior art are addressed through the invention of a method and apparatus for regenerative signaling. Specifically, a method according to one embodiment of the invention includes receiving at least one base protocol message formatted in accordance with at least one base protocol, obtaining service information associated with at least one network service, and generating, in response to the at least one base protocol message, at least one companion protocol message formatted in accordance with at least one companion protocol. The at least one base protocol message is associated with at least one service endpoint. The service information associated with at least one network service is obtained using the at least one base protocol message. The at least one companion protocol message is generated using at least a portion of the service information. The at least one companion protocol message is operable for controlling the at least one network service in a manner substantially transparent to the at least one service endpoint.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
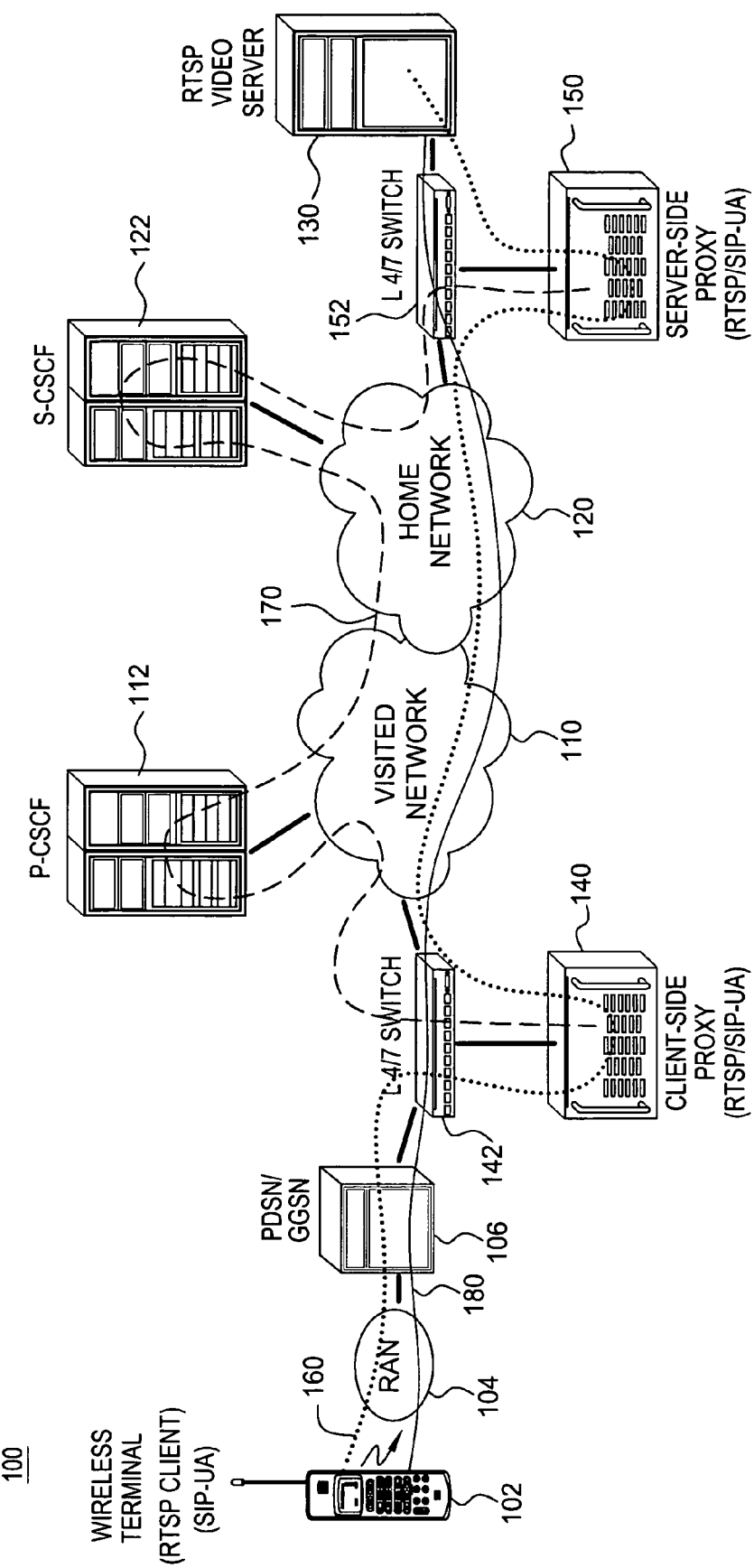
FIG. 1 depicts a high-level block diagram of a communications network architecture.

The present invention is discussed in the context of an Internet Protocol (IP) multimedia subsystem (IMS) network architecture; however, the present invention can readily be applied to other networks, network topologies, network elements, service endpoints, network services, and the like. It should be noted that the IMS framework applies to both wireline as well as wireless networks. As such, although primarily described herein with respect to wireless networks, the methodologies of the present invention may be utilized in wireline networks, wireless networks, and various combinations of the two.

In general, the present invention provides regenerative signaling capabilities. In one embodiment, the regenerative signaling capabilities of the present invention are implemented such that at least one base protocol is used for generating at least one companion protocol. In one embodiment, the at least one companion protocol is operable for controlling at least one network function in a manner substantially transparent to at least one service endpoint. In one embodiment, the present invention utilizes at least one of a client-side proxy and a server-side proxy, or various combinations thereof.

In one embodiment, in which both a client-side proxy and a server-side proxy are deployed, the client-side proxy and server-side proxy base protocol messaging between service endpoints. In one further embodiment, the client-side proxy and server-side proxy originate/terminate companion protocol messaging using at least a portion of the proxied base protocol messaging. As such, in this embodiment, the client-side proxy and server-side proxy render the companion protocol messaging transparent to the service endpoints (e.g., transparent to the RTSP client (e.g., wireless terminal) and the RTSP server (e.g., video server)).

By rendering the companion protocol transparent to the service endpoints, the present invention thereby obviates the need for client-side device upgrades and server-side device upgrades in order to utilize network services. In other words, various network services may be enhanced without requiring corresponding service endpoint enhancements, and various other applications may be easily integrated in to the network. Furthermore, third-party software may be used by both the client-side service endpoint and the server-side service endpoint without requiring corresponding enhancements to the client-side service endpoint or the server-side service endpoint.

In one embodiment, the present invention maintains a base protocol finite state machine (FSM) associated with the at least one base protocol and maintains a companion protocol finite state machine (FSM) associated with the at least one companion protocol. In one such embodiment, the base protocol FSM is operable for managing a corresponding base protocol message and the companion protocol FSM is operable for managing a corresponding companion protocol message. In one embodiment, the present invention maintains the base protocol FSM and the companion protocol FSM in a manner tending to enable synchronization of base protocol messaging and companion protocol messaging. In one embodiment, synchronization is performed in a manner tending to enable utilization of at least one network service in a manner substantially transparent to at least one service endpoint.

In one embodiment, a base protocol may comprise any protocol operable for performing signaling between service endpoints and a companion protocol may comprise any protocol operable for performing signaling between network elements. For example, in one embodiment, as primarily described herein, a base protocol comprises Real Time Streaming Protocol (RTSP) used for establishing a Real Time Protocol (RTP) bearer connection between a client (e.g., a wireless user terminal) and a server (e.g., a video server) that is operable for streaming video content from the video server to the wireless terminal. For example, in one embodiment, as primarily described herein, a companion protocol comprises Session Initiation Protocol (SIP) used for establishing IMS services, such as a guaranteed quality-of-service (QOS) for streaming of the video content from the video server to the wireless terminal.

FIG. 1 depicts a high-level block diagram of a communications network architecture. Specifically, communications network architecture 100 of FIG. 1 comprises a wireless terminal (WT) 102, a radio access network (RAN) 104, a serving node (SN) 106, a visited network (VN) 110, a proxy call session control function (P-CSCF) 112 associated with VN 110, a home network (HN) 120, a serving call session control function (S-CSCF) 122 associated with HN 120, a video server (VS) 130, a client-side proxy (CSP) 140, a layer 4/7 switch (L4/7-S) 142 associated with CSP 140, a server-side proxy (SSP) 150, a layer 4/7 switch (L4/7-S) 152 associated with SSP 150.

As depicted in FIG. 1, WT 102 communicates with RAN 104 using wireless signaling. The WT 102 communicates with SN 106 using RAN 104. The SN 106 communicates with L4/7-S 142. The L4/7-S 142 communicates with CSP 140 and VN 110. The VN 110 and HN 120 communicate using standard IP communications. The VN 110 communicates with associated P-CSCF 112. Similarly, HN 120 communicates with associated S-CSCF 122. The HN 120 communicates with L4/7-S 152. The L4/7-S 152 communicates with SSP 150 and VS 130. As depicted in FIG. 1, communication network architecture 100 of FIG. 1 comprises a RTSP signaling path (RSP) 160, a SIP signaling path (SSP) 170, and a RTP bearer path (RBP) 180.

As depicted in FIG. 1, WT 102 comprises a wireless user device operable for transmitting and receiving information (e.g., communicating with other wireless user devices, receiving streaming video content, and the like), presenting content to at least one user (e.g., playing received audio content, displaying streaming video content, and the like), and performing like functions. For example, WT 102 comprises a mobile phone, a personal data assistant (PDA), a computer, and like wireless user devices. As such, WT 102 comprises a service endpoint according to the present invention.

In one embodiment, WT 102 comprises at least one client. In one embodiment, the at least one client is associated with at least one protocol. For example, as depicted in FIG. 1, WT 102 comprises a RTSP client operable for performing RSTP signaling (e.g., for establishing a connection with a video server for obtaining streaming video content). Similarly, as depicted in FIG. 1, WT 102 comprises a SIP client (i.e., operates as a SIP user agent (SIP-UA)) operable for performing SIP signaling (e.g., for establishing a guaranteed QOS within RAN 104). As depicted in FIG. 1, WT 102 accesses SN 106 using RAN 104.

As depicted in FIG. 1, RAN 104 comprises a radio access network operable for supporting communications between WT 102 and SN 106. For example, RAN 104 comprises at least one of a Code Division Multiple Access (CDMA) RAN, a Universal Mobile Telecommunications System (UMTS) RAN, a General Packet Radio Service (GPRS) RAN, or like RANs as known in the art. Thus, in one embodiment, SN 106 comprises at least one of a packet data serving node (PDSN) (i.e., in CDMA networks), a gateway GPRS serving node (GGSN) (i.e., in UMTS networks), or like nodes as known in the art. The SN 106 is operable for supporting communications between WT 102 and L4/7-S 142.

As depicted in FIG. 1, VN 110 and HN 120 comprise IP networks. The VN 110 comprises an associated proxy control function (illustratively, P-CSCF 112) operable for supporting communications with HN 120. The HN 120 comprises an associated serving control function (illustratively, S-CSCF 122) operable for supporting communications with VN 110. Although not depicted, in one embodiment, HN 120 comprises a subscriber serving function (e.g., a Home Subscriber Server (HSS)). As depicted in FIG. 1, VN 110 is operable for supporting signaling associated with P-CSCF 112 and HN 120 is operable for supporting signaling associated with S-CSCF 122.

As depicted in FIG. 1, VN 110 and HN 120 comprise IP networks operable for supporting base protocol messaging between service endpoints (illustratively, between WT 102 and VS 130). In one embodiment, VN 110 and HN 120 comprise IP networks operable for supporting companion protocol messaging between CSP 140 and SSP 150. As depicted in FIG. 1, in one embodiment, network-based services are enabled on HN 120 and proxied by VN 110. As described herein, the network-based services may be provided to the service endpoints transparently using at least one companion protocol. In one embodiment, at least a portion of the network-based services transparently utilized by the service endpoints are controlled by call state control functions (CSCFs) associated with VN 110 and HN 120 (illustratively, P-CSCF 112 and S-CSCF 122).

As depicted in FIG. 1, P-CSCF 112 and S-CSCF 122 comprise call session control functions as known in the art. In general, CSCFs comprise SIP proxies operable for controlling various network functions and services. For example, P-CSCF 112 and S-CSCF 122 perform QOS assignment by accessing Policy Decision Functions (PDFs) for QOS treatment queries, enforce the associated QOS controls, and perform like functions using SIP signaling. As such, in one embodiment, P-CSCF 112 and S-CSCF 122 support SIP companion protocol messaging required for establishing and maintaining a guaranteed QOS for streaming of video content from VS 130 to WT 102.

As depicted in FIG. 1, L4/7-S 142 and L4/7-S 152 comprise layer 4/7 switches. In general, layer 4/7 switches comprise content-aware switches operable for directing traffic to network components based on packet inspection performed at layer 4 (i.e., the transport layer) and layer 7 (i.e., the application layer). As such, L4/7-S 142 and L4/7-S 152 are operable for obtaining session information. Furthermore, L4/7-S 142 and L4/7-S 152 are operable for obtaining application information such as content type requested (e.g., static content, streaming video content, and the like), content requested, and like information.

As depicted in FIG. 1, L4/7-S 142 associated with CSP 140 comprises a network element operable for redirecting protocol messages. In one embodiment, L4/7-S 142 redirects base protocol messages to CSP 140. In one further embodiment, L4/7-S 142 redirects base protocol messages proxied by CSP 140 to one of VN 110 (i.e., for client-originated messages) and SN 106 (i.e., for client-terminated messages). In one embodiment, L4/7-S 142 redirects companion protocol messages to CSP 140. In one further embodiment, L4/7-S 142 redirects companion protocol messages originated by CSP 140 to VN 110 and redirects companion protocol messages originated by SSP 150 to CSP 140.

For example, in one embodiment, in which the base protocol comprises RTSP, L4/7-S 142 redirects client-originated RTSP messages (i.e., originated by WT 102) to CSP 140 using destination TCP port 554. In one further embodiment, L4/7-S 142 redirects client-originated RTSP messages proxied by CSP 140 toward VN 110 for transmission towards VS 130. Similarly, for example, in one embodiment, in which the base protocol comprises RTSP, L4/7-S 142 redirects client-terminated RTSP messages (i.e., originated by VS 130) to CSP 140 using source TCP port 554. In one further embodiment, L4/7-S 142 redirects client-terminated RTSP messages proxied by CSP 140 toward SN 106 for transmission towards WT 102.

In one embodiment, as described herein, L4/7-S 142 redirects server-originated companion protocol messages to CSP 140. For example, in one embodiment, in which the companion protocol comprises SIP, L4/7-S 142 redirects client-originated SIP messages (i.e., originated by CSP 140) to VN 110 for transmission towards SSP 150. Similarly, in one embodiment, in which the companion protocol comprises SIP, L4/7-S 142 redirects server-originated SIP messages (i.e., originated by SSP 150) to CSP 140 using destination TCP/UDP port X (e.g., where X is not equal to 5060). By redirecting server-originated companion protocol messages to CSP 140, L4/7-S 142 enables companion protocol messaging operable for controlling at least one network service in a manner substantially transparent to the client service endpoint (illustratively, WT 102).

As depicted in FIG. 1, L4/7-S 152 associated with SSP 150 comprises a network element operable for redirecting protocol messages. In one embodiment, L4/7-S 152 redirects base protocol messages to SSP 150. In one such embodiment, L4/7-S 152 redirects base protocol messages proxied by SSP 150 to one of HN 120 (i.e., for server-originated messages) and VS 130 (i.e., for server-terminated messages). In one embodiment, L4/7-S 152 redirects companion protocol messages to SSP 150. In one such embodiment, L4/7-S 152 redirects companion protocol messages originated by SSP 150 to HN 120 and redirects companion protocol messages originated by CSP 140 to SSP 150.

For example, in one embodiment, in which the base protocol comprises RTSP, L4/7-S 152 redirects server-originated RTSP messages (i.e., originated by VS 130) to SSP 150 using source TCP port 554. In one further embodiment, L4/7-S 152 redirects server-originated RTSP messages proxied by SSP 150 toward HN 120 for transmission towards WT 102. Similarly, for example, in one embodiment, in which the base protocol comprises RTSP, L4/7-S 152 redirects server-terminated RTSP messages (i.e., originated by WT 102) to SSP 150 using destination TCP port 554. In one further embodiment, L4/7-S 152 redirects server-terminated RTSP messages proxied by SSP 150 for transmission toward VS 130.

In one embodiment, as described herein, L4/7-S 152 redirects client-originated companion protocol messages to SSP 150. For example, in one embodiment, in which the companion protocol comprises SIP, L4/7-S 152 redirects server-originated SIP messages (i.e., originated by SSP 150) to HN 120 for transmission towards CSP 140. Similarly, in one embodiment, in which the companion protocol comprises SIP, L4/7-S 152 redirects client-originated SIP messages (i.e., originated by CSP 150) to SSP 150 using TCP/UDP port X (e.g., where X is equal to 5060). By redirecting client-originated companion protocol messages to SSP 150, L4/7-S 152 enables companion protocol messaging operable for controlling at least one network service in a manner substantially transparent to the server service endpoint (illustratively, VS 130).

As depicted in FIG. 1, VS 130 comprises a video server operable for receiving and processing video content retrieval requests, transmitting requested video content to user devices (illustratively, WT 102), and performing like functions. As such, VS 130 comprises a service endpoint according to the present invention. As depicted in FIG. 1, VS 130 comprises an RTSP video server. Although depicted as an RTSP video server, VS 130 may comprise any video server. Furthermore, although depicted as a video server, architecture depicted and described with respect to FIG. 1 may be used for supporting communications between WT 102 and any other service endpoint (e.g., an audio server, other content servers, at least one other user device (e.g., a callee device), and like devices).

As depicted in FIG. 1, CSP 140 and SSP 150 comprise network elements operable for performing at least a portion of the regenerative signaling functions of the present invention. In one embodiment, at least one of CSP 140 and SSP 150 is operable for generating at least one companion protocol message formatted in accordance with at least one companion protocol in response to at least one base protocol message formatted in accordance with at least one base protocol. Similarly, in one embodiment, at least one of CSP 140 and SSP 150 is operable for terminating at least one companion protocol message formatted in accordance with at least one companion protocol message such that the companion protocol messaging is transparent to the service endpoints.

As such, CSP 140 and SSP 150 enable service endpoints to utilize network-based services in a manner substantially transparent to the service endpoints. In one embodiment, CSP 140 and SSP 15*b* are operable for generating and maintaining at least one base protocol FSM. Similarly, in one embodiment, CSP 140 and SSP 150 are operable for generating and maintaining at least one companion protocol FSM. In one further embodiment, CSP 140 and SSP 150 are operable for maintaining the at least one base protocol FSM and the at least one companion protocol FSM in a manner enabling synchronization of messaging between the at least one base protocol and the at least one companion protocol.

In one further embodiment, in which the present invention is employed for supporting communications between user devices utilizing an end-to-end signaling protocol identical to a companion protocol, L4/7-S 142 and L4/7-S 152 comprise switches operable for distinguishing base protocol messages from companion protocol messages. For example, assuming that SIP signaling is used for end-to-end base protocol messaging as well as network-based companion protocol messaging, L4/7-S 142 and L4/7-S 152 redirect base protocol messages proxied by CSP 140 and SSP 150, respectively, for transmission towards the service endpoints. Furthermore, L4/7-S 142 and L4/7-S 152 redirect companion protocol messages originated/terminated by CSP 140 and SSP 150, respectively, in a manner preventing transmission of companion protocol messages towards the service endpoints.

In one further embodiment, in which the present invention is employed for supporting communications between user devices utilizing an end-to-end signaling protocol that is identical to a companion protocol, CSP 140 and SSP 150 comprise proxies operable for distinguishing base protocol messages from companion protocol messages. For example, assuming that SIP signaling is used for end-to-end base protocol messaging as well as network-based companion protocol messaging, CSP 140 and SSP 150 proxy base protocol messages for transmission towards the respective service endpoints. Furthermore, CSP 140 and SSP 150 originate/terminate companion protocol messages to render companion protocol messaging transparent to the service endpoints.

As depicted in FIG. 1, RSP 160 comprises an end-to-end RTSP signaling path between service endpoints (illustratively, between WT 102 and VS 130). As such, as described herein, RTSP is utilized as a base protocol for end-to-end signaling between service endpoints. In one embodiment, RSP 160 comprises a bi-directional signaling path using IP as a bearer. For example, client-originated RTSP messages traverse RAN 104, SN 106, L4/7-S 142, CSP 140, L4/7-S 142, VN 110, HN 120, L4/7-S 152, SSP 150, and L4/7-S 152, and terminate on VS 130. Similarly, for example, server-originated RTSP messages traverse L4/7-S 152, SSP 150, L4/7-S 152, HN 120, VN 110, L4/7-S 142, CSP 140, L4/7-S 142, SN 106, and RAN 104, and terminate on WT 102.

Although the RTSP base protocol messaging traverses the proxies (i.e., CSP 140 and SSP 150), the proxies simply read the base protocol messages in order to obtain service information associated with at least one network service. As described herein, the network information obtained by proxies CSP 140 and SSP 150 from reading base protocol messages between the service endpoints is used for generating associated companion protocol messages (i.e., for performing regenerative signaling according to the present invention). As such, upon completion of at least a portion of RTSP signaling using RSP 160, SSP 170 is established in accordance with the present invention.

As depicted in FIG. 1, SSP 170 comprises a bi-directional signaling path between network proxies (illustratively, CSP 140 and SSP 150). As such, in one embodiment, as primarily described herein, SIP is utilized as a companion protocol for signaling between network proxies. For example, client-side SIP messages originated by CSP 140 traverse L4/7-S 142, VN 110, P-CSCF 112, VN 110, HN 120, S-CSCF 122, HN 120, and L4/7-S 152, and terminate on SSP 150. Similarly, server-side SIP messages originated by SSP 150 traverse L4/7-S 152, HN 120, S-CSCF 122, HN 120, VN 110, P-CSCF 112, VN 110, and L4/7-S 142, and terminate on CSP 140.

As described herein, SSP 170 supports SIP companion protocol messaging operable for configuring at least one network component in a manner enabling service endpoints to utilize at least one network-based service. Furthermore, in one embodiment, companion protocol messaging between proxies (illustratively, CSP 140 and SSP 150) is transparent to the service endpoints (illustratively, WT 102 and VS 130). In one embodiment, in which the network service comprises a QOS assurance service, SIP companion protocol messaging negotiates the parameters (e.g., type of video, required bandwidth, ports used for transmitting video, coder-decoders used, and the like) required for providing the guaranteed-QOS streaming video network service.

Upon completion of RTSP messaging using RSP 160 (for establishing an end-to-end bearer path between service endpoints) and SIP signaling using SSP 170 (for controlling at least one network service provided to the service endpoints), RBP 180 established between the service endpoints is utilized for enabling the exchange of information between service endpoints in accordance with the at least one network service controlled using companion protocol messaging. As depicted in FIG. 1, RBP 180 is established between WT 102 and VS 130. In other words, video content is streamed from VS 130 to WT 102 over RBP 180 using a guaranteed QOS established by signaling over SSP 170. In one embodiment, video content is transported using RTP over user datagram protocol (UDP) over IP.

In existing network architectures not implemented according to the present invention, the L4/7 switches (illustratively, L4/7-S 142 and L4/7-S 152) and proxies (illustratively, CSP 140 and SSP 150) are not deployed. As such, for example, assume that WT 102 comprises an RTSP client requesting streaming video from VS 130. As described herein, since the CSCFs (illustratively, P-CSCF 112 and S-CSCF 122) comprise SIP proxies, RTSP signaling does not traverse the CSCFs. As such, since the CSCFs control IMS services such as QOS, billing, user profile management, and like network services, the RTSP client on the wireless terminal (which is not a SIP-UA) cannot utilize these IMS network services controlled using SIP signaling.

As such, in one embodiment, the regenerative signaling capabilities of the present invention enable service endpoints to transparently obtain the benefits of network-based functions and services. In other words, the service endpoints are agnostic as to control of network-based functions and services. Furthermore, the present invention enables service endpoints to utilize network-based functions and services irrespective of service endpoint capabilities. For example, using the present invention, an RTSP client that does not support SIP capabilities (i.e., not a SIP-UA) may utilize SIP-based network services.

As described herein, a RTSP message is transmitted from WT 102 to SN 106 over RAN 104. The SN 106 transmits the RTSP message to L4/7-S 142 associated with CSP 140. The L4/7-S 142 redirects the RTSP message to CSP 140. The CSP 140 reads the RTSP message to obtain service information associated with at least one network service. The CPS 140 proxies the RTSP message back to L4/7-S 142, and L4/7-S 142 transmits the proxied RTSP message over at least one IP network (illustratively, VN 110 and HN 120) to L4/7-S 152 associated with SSP 150. The L4/7-S 152 redirects the RTSP message to SSP 150. The SSP 150 reads the RTSP message to obtain service information associated with the at least one network service. The SSP 150 proxies the RTSP message to L4/7-S 152, and L4/7-S 152 transmits the proxied RTSP message to VS 130 for establishing a connection operable for streaming video content from VS 130 to WT 102.

As such, the RTSP messages (i.e., base protocol messages) are read by CSP 140 and SSP 150, thereby enabling CSP 140 and SSP 150 to obtain service information operable for enabling CSP 140 and SSP 150 to originate and terminate messages using at least one protocol (i.e., at least one companion protocol) in a manner substantially transparent to the service endpoints. For example, CSP 140 originates at least one SIP message based on the service information read by CSP 140 while proxying RTSP messages. The CSP 140 transmits the SIP message to L4/7-S 142. Since P-CSCF 112 and S-CSCF 122 comprise SIP proxies, L4/7-S 142 transmits the SIP message to P-CSCF 112 which then transmits the SIP message to S-CSCF 122. The S-CSCF 122 transmits the SIP message to L4/7-S 152. As such, the SIP message traverses SIP proxies for accessing at least one network service. The L4/7-S 152 redirects the SIP message to SSP 150 where the SIP message is processed and terminated. In one embodiment, SSP 150 generates a SIP response message in response to the at least one SIP message received from CSP 140.

As described herein, in one embodiment, CSP 140 records SDP parameters, ports, CODECs, and like network service parameters negotiated between WT 102 and VS 130 using base protocol messaging (e.g., RTSP messaging). In one embodiment, CSP 140 utilizes such service information for generating associated base protocol messages (e.g., SIP messages) operable for utilizing at least one network service in a manner substantially transparent to the service endpoints. In other words, CSP 140 uses service information obtained from base protocol messages for generating associated companion protocol messages operable for utilizing at least one network service in a manner substantially transparent to service endpoints.

Similarly, in one embodiment, SSP 150 records SDP parameters, ports, CODECs, and like service information negotiated using RTSP messaging between WT 102 and VS 130. In one embodiment, SSP 150 receives the SIP messages initiated by CSP 140 using the service information recorded during RTSP signaling. In one such embodiment, SSP 150 establishes the SIP session between CSP 140 and SSP 150 on behalf of VS 130 using SDP announced by VS 130 and recorded by SSP 150 during RTSP message exchange, RTSP negotiated ports and CODECs recorded by SSP 150 during RTSP message exchange, and like service information.

Figure 2:
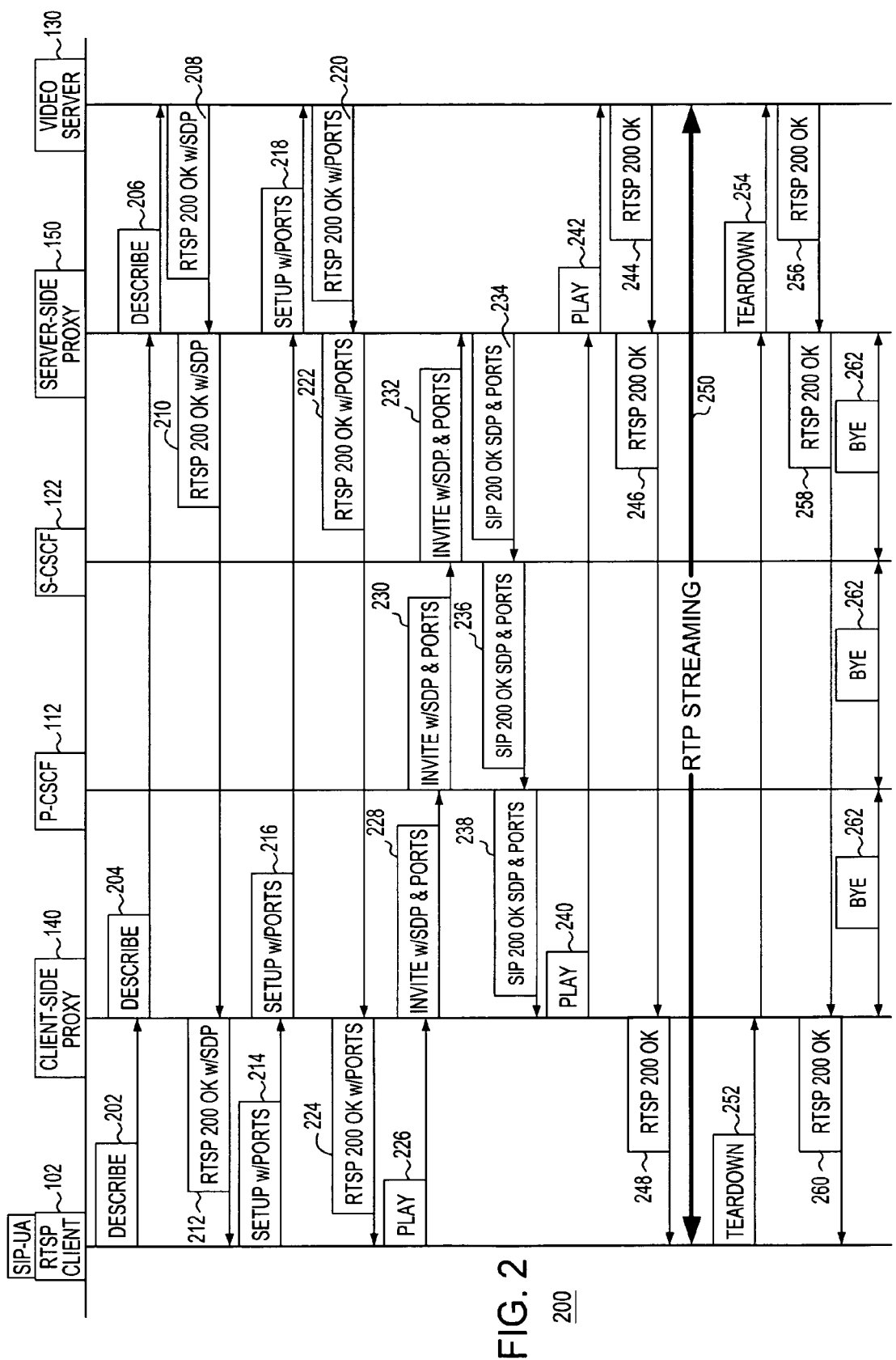
FIG. 2 depicts a call flow diagram according to one embodiment of the invention.

FIG. 2 depicts a call flow diagram according to one embodiment of the invention. Specifically, call flow diagram 200 of FIG. 2 comprises a call flow for enabling service endpoints to utilize at least one network service in a manner substantially transparent to the service endpoints. As depicted in FIG. 2, call flow diagram 200 of FIG. 2 is described within the context of communication network architecture 100 of FIG. 1. As such, although not depicted, L4/7-S 142 and L4/7-S 152 are used for redirecting communications associated with CSP 140 and SSP 150, respectively, as depicted and described herein with respect to FIG. 1.

Although a portion of the steps are depicted as being performed serially, those skilled in the art will appreciate that at least a portion of the steps of method 200 may be performed contemporaneously, as well as in a different order than presented in FIG. 2. The call flow diagram 200 is initiated in response to a request by a service endpoint (illustratively, WT 102) to establish a connection with another service endpoint (illustratively, VS 130) for exchanging information. As such, as depicted in FIG. 2, call flow diagram 200 of FIG. 2 begins at step 202.

At step 202, an RTSP DESCRIBE message is originated by an RTSP client portion of WT 102. The RTSP DESCRIBE message is redirected to CSP 140. The RTSP DESCRIBE message is read by CSP 140 for obtaining service information associated with at least one network service. At step 204, CSP 140 proxies the RTSP DESCRIBE message for transmission toward VS 130. The RTSP DESCRIBE message is redirected to SSP 150. The SSP 150 reads the RTSP DESCRIBE message for obtaining service information associated with at least one network service. At step 206, SSP 150 proxies the RTSP DESCRIBE message for transmission to VS 130.

At step 208, upon receiving the RTSP DESCRIBE message from SSP 150, VS 130 initiates an RTSP 200 OK message. In one embodiment, the RTSP 200 OK message comprises at least one SDP parameter. The VS 130 transmits the RTSP 200 OK message towards WT 102. The RTSP 200 OK message initiated by VS 130 is redirected to SSP 150. The SSP 150 reads the RTSP 200 OK message for obtaining service information associated with at least one network service. At step 210, SSP 150 transmits the RTSP 200 OK message towards WT 102. The RTSP 200 OK message is redirected to CSP 140. The CSP 140 reads the RTSP 200 OK message for obtaining service information associated with at least one network service. At step 212, CSP 140 transmits the RTSP 200 OK message towards the RTSP client portion of WT 102.

At step 214, upon receiving the RTSP 200 OK message, the RTSP client portion of WT 102 initiates an RTSP SETUP message. In one embodiment, the RTSP SETUP message comprises at least one port parameter. The RTSP SETUP message is transmitted toward VS 130. The RTSP SETUP message is redirected towards CSP 140. The CSP 140 reads the RTSP SETUP message for obtaining service information associated with at least one network service. At step 216, CSP 140 proxies the RTSP SETUP message for transmission toward VS 130. The RTSP SETUP message is redirected to SSP 150. In one embodiment, SSP 150 reads the RTSP SETUP message for obtaining service information associated with at least one network service. At step 218, SSP 150 proxies the RTSP SETUP message for transmission toward VS 130.

At step 220, upon receiving the RTSP SETUP message, VS 130 initiates an RTSP 200 OK message. In one embodiment, the RTSP 200 OK message comprises at least one port parameter. The VS 130 transmits the RTSP 200 OK message towards WT 102. The RTSP 200 OK message is redirected to SSP 150. The SSP 150 reads the RTSP 200 OK message for obtaining service information associated with at least one network service. At step 222, SSP 150 proxies the RTSP 200 OK message for transmission towards WT 102. The RTSP 200 OK message is redirected to CSP 140. The CSP 140 reads the RTSP 200 OK message for obtaining service information associated with at least one network service. At step 224, CSP 140 proxies the RTSP 200 OK message for transmission towards the RTSP client portion of WT 102.

At step 226, upon receiving the RTSP 200 OK message, the RTSP client portion of WT 102 initiates an RTSP PLAY message. The RTSP client portion of WT 102 transmits the RTSP PLAY message toward VS 130. The RTSP PLAY message is redirected to CSP 140. As depicted in FIG. 2, CSP 140 holds the RTSP play message pending completion of companion protocol messaging required for utilizing at least one network service in a manner transparent to the service endpoints. Upon completion of companion protocol messaging for utilizing at least one network service, CSP 140 releases the RTSP PLAY message for transmission to VS 130 to establish the RTP bearer path over which VS 130 streams video content to WT 102 in accordance with the network services (e.g., QOS) configured using the companion protocol messaging.

At step 228, in response to the RTSP PLAY message, CSP 140 holds the RTSP PLAY message received from the RTSP client portion of WT 102 and initiates a SIP INVITE message to VS 130. In one embodiment, the SIP INVITE message comprises at least a portion of the service information obtained by CSP 140 by reading RTSP messages. For example, in one embodiment, the SIP INVITE message to VS 130 is generated using a user IP address as the source (i.e., inserting a user IP address into the FROM field of the associated SIP header), announced SDP recorded during RTSP message exchanges between WT 102 and VS 130, RTSP negotiated ports and CODECs recorded by CSP 140 during RTSP message exchange between WF 102 and VS 130, and like service information operable for generating at least one message for utilizing at least one network service.

For example, in one embodiment, the SIP INVITE message comprises at least one SDP parameter obtained by CSP 140 by reading the RTSP 200 OK message associated with steps 208-212. For example, in one embodiment, the SIP INVITE message comprises at least one port obtained by CSP 140 by reading the RTSP SETUP message and RTSP 200 OK message associated with steps 214-218 and steps 220-224, respectively. In other words, CSP 140 receives a base protocol message (e.g., RTSP 200 OK message), and generates a companion protocol message (e.g., SIP invite message) in response to the base protocol message.

The CSP 140 transmits the SIPINVITE message to P-CSCF 112. The P-CSCF 112 processes the SIP INVITE message for utilizing at least one network service. At step 230, P-CSCF 112 transmits the SIP INVITE message to S-CSCF 122. The S-CSCF 122 processes the SIP INVITE message for utilizing at least one network service. At step 232, S-CSCF 122 transmits the SIP INVITE message to SSP 150, where the SIP INVITE message is terminated by SSP 150 in order to render the SIP messaging transparent to VS 130.

At step 234, SSP 150 initiates a SIP 200 OK message in response to the SIP INVITE message. In one embodiment, the SIP 200 OK message comprises at least one SDP parameter and at least one port parameter. The SIP 200 OK message is transmitted to S-CSCF 122. The S-CSCF 122 processes the SIP 200 OK message for utilizing at least one network service. At step 236, S-CSCF 122 transmits the SIP 200 OK message to P-CSCF 112. The P-CSCF 112 processes the SIP 200 OK message for utilizing at least one network service. At step 238, the SIP 200 OK message is transmitted to CSP 140, where the SIP 200 OK message is terminated by CSP 140 to render the SIP messaging transparent to WT 102.

In one embodiment, the SIP companion protocol messaging between CSP 140 and SSP 150 is used for performing IMS QOS authorization processing for ensuring that the video content streamed from VS 130 to WT 102 is streamed with a particular QOS. If the IMS QOS authorization processing using SIP messaging between CSP 140 and SSP 150 fails, CSP 140 rejects the RTSP play message and terminates the RTSP session between WT 102 and VS 130, thereby preventing establishment of an RTP session for streaming video. If the IMS QOS authorization processing between CSP 140 and SSP 150 succeeds, CSP 140 forwards the RTSP play message to VS 130 for establishing an RTP session operable for streaming video from VS 130 to WT 102.

At step 240, upon successful completion of SIP messaging for accessing at least one network service (e.g., validation of the SIP 200 OK message by CSP 140), CSP 140 releases the RTSP PLAY message held by CSP 140 (since being received by CSP 140 at step 226). The CSP 140 transmits the RTSP PLAY message toward VS 130. The RTSP PLAY message is redirected to SSP 150. At step 242, the RTSP PLAY message is proxied from SSP 150 to VS 130. The VS 130 processes the RTSP PLAY message for establishing an associated RTP bearer path operable for streaming video content from VS 130 to WT 102 using the at least one network service accessed using the SIP signaling associated with steps 228-238.

At step 244, VS 130 transmits an RTSP 200 OK message towards the RTSP client portion of WT 102. The RTSP 200 OK message is redirected to SSP 150. At step 246, the RTSP 200 OK message is transmitted by SSP 150 toward the RTSP client portion of WT 102. The RTSP 200 OK message is redirected to CSP 140. At step 248, the RTSP 200 OK message is proxied by CSP 140 to the RTSP client portion of WT 102. At step 250, upon receiving the RTSP 200 OK acknowledgement message, the RTP bearer signaling path is established between VS 130 and WT 102, and VS 130 begins streaming video content to WT 102. As such, the video content is streamed from VS 130 to WT 102 in accordance with at least one network service controlled by the network using SIP signaling in a manner transparent to WT 102 and VS 130.

At step 252, upon completion of the streaming of video content from VS 130 to WT 102, the WT 102 initiates a RTSP TEARDOWN message. The RTSP TEARDOWN message is transmitted toward VS 130. The RTSP TEARDOWN message is redirected to CSP 140. At step 254, CSP 140 proxies the RTSP TEARDOWN message towards VS 130. The RTSP TEARDOWN message is redirected to SSP 150. At step 256, SSP 150 proxies the RTSP TEARDOWN message to VS 130. The VS 130 receives the RTSP TEARDOWN message.

At step 258, VS 130 initiates an RTSP 200 OK message in response to the RTSP teardown message. The VS 130 transmits the RTSP 200 OK message toward the RTSP client portion of WT 102. The RTSP 200 OK message is redirected to SSP 150. At step 260, SSP 150 proxies the RTSP 200 OK message toward the RTSP client portion of WT 102. The RTSP 200 OK message is redirected to CSP 140. At step 262, CSP 140 proxies the RTSP 200 OK message to the RTSP client portion of WT 102. At step 264, SIP BYE messages are exchanged between CSP 140 and P-CSCF 112, P-CSCF 112 and S-CSCF 122, and S-CSCF 122 and SSP 150, thereby releasing the at least one network service utilized by the service endpoints.

In one embodiment, in which the present invention is implemented in an IMS network, or a SIP-based application, WT 102 handles both IMS QOS authentication processing with P-CSCF 112 and RAN QOS reservation processing with SN 106 prior to RTP session establishment between WT 102 and VS 130. In one embodiment, depicted and described herein with respect to FIG. 3, IMS QOS authentication fails. In another embodiment, depicted and described herein with respect to FIG. 4, IMS QOS authentication succeeds and RAN QOS setup fails. In another embodiment, depicted and described with respect to FIG. 5, IMS QOS authentication succeeds and RAN QOS setup succeeds. Although primarily described herein with respect to QOS, various other network services may be transparently provided to service endpoints using the present invention.

Figure 3:
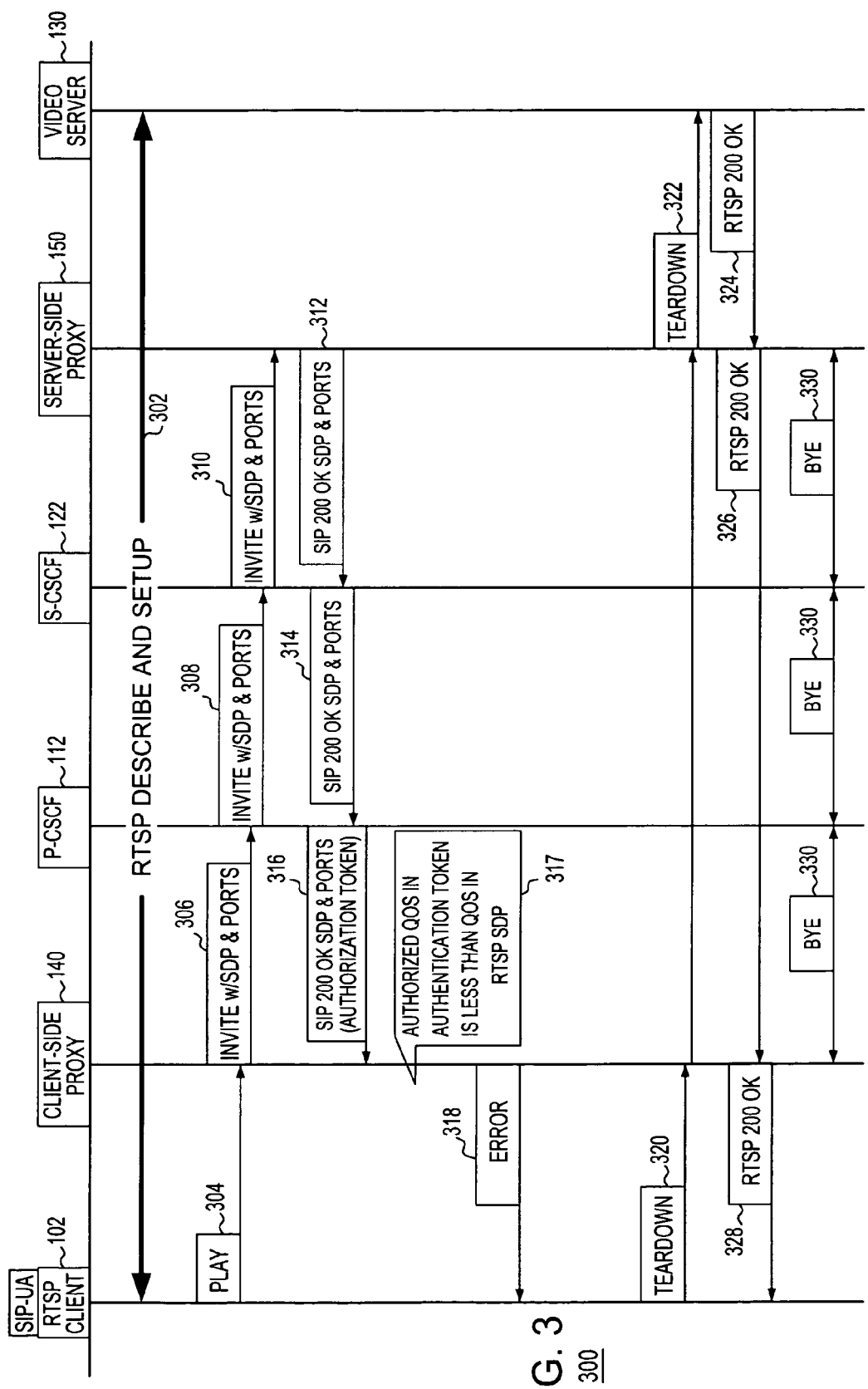
FIG. 3 depicts a call flow diagram according to one embodiment of the invention in which service endpoints attempt to utilize a network service.

FIG. 3 depicts a call flow diagram according to one embodiment of the invention. Specifically, call flow diagram 300 of FIG. 3 comprises a call flow for enabling service endpoints to ensure QOS in a manner transparent to the service endpoints. As depicted in FIG. 3, call flow diagram 300 of FIG. 3 is described within the context of communication network architecture 100 of FIG. 1. As such, although not depicted, L4/7-S 142 and L4/7-S 152 are used for redirecting communications associated with CSP 140 and SSP 150, respectively, as depicted and described herein with respect to FIG. 1.

At least a portion of call flow diagram 300 of FIG. 3 is substantially similar to call flow diagram 200 of FIG. 2. Furthermore, although a portion of the steps are depicted as being performed serially, those skilled in the art will appreciate that at least a portion of the steps of method 300 may be performed contemporaneously, as well as in a different order than presented in FIG. 3. The call flow diagram 300 is initiated in response to a request by a service endpoint (illustratively, WT 102) to establish a connection with another service endpoint (illustratively, VS 130) for exchanging information. As such, as depicted in FIG. 3, call flow diagram 300 of FIG. 3 begins at step 302.

At step 302, RTSP SETUP message communications/processing and RTSP DESCRIBE message communications/ processing is performed. In one embodiment, RTSP SETUP message communications/processing and RTSP DESCRIBE message communications/processing of step 302 are performed in a manner substantially similar to RTSP SETUP/DESCRIBE message communications/processing performed in steps 202-224 of FIG. 2. At step 304, upon receiving the RTSP 200 OK message, the RTSP client portion of WT 102 initiates an RTSP PLAY message towards VS 130. As described herein with respect to FIG. 2, CSP 140 holds the RTSP PLAY message pending completion of companion protocol messaging required for ensuring a particular QOS for streaming video from VS 130 to WT 102.

At steps 306-316, SIP INVITE message communications/processing is performed. In one embodiment, SIP INVITE message communications/processing of steps 306-316 is performed in a manner substantially similar to SIP INVITE message communications/processing performed in steps 228-238 depicted and described with respect to FIG. 2. As depicted in FIG. 3, in one embodiment, an authorization token is generated by P-CSCF 112 in response to completion of the SIP handshake between CSP 140 and SSP 150. In one such embodiment, the authorization token is passed to CSP 140 as a portion of a SIP 200 OK message generated by SSP 150 and transmitted to SSP 140 via S-CSCF 122 and P-CSCF 112 (as depicted in steps 312-316).

Figure 4:
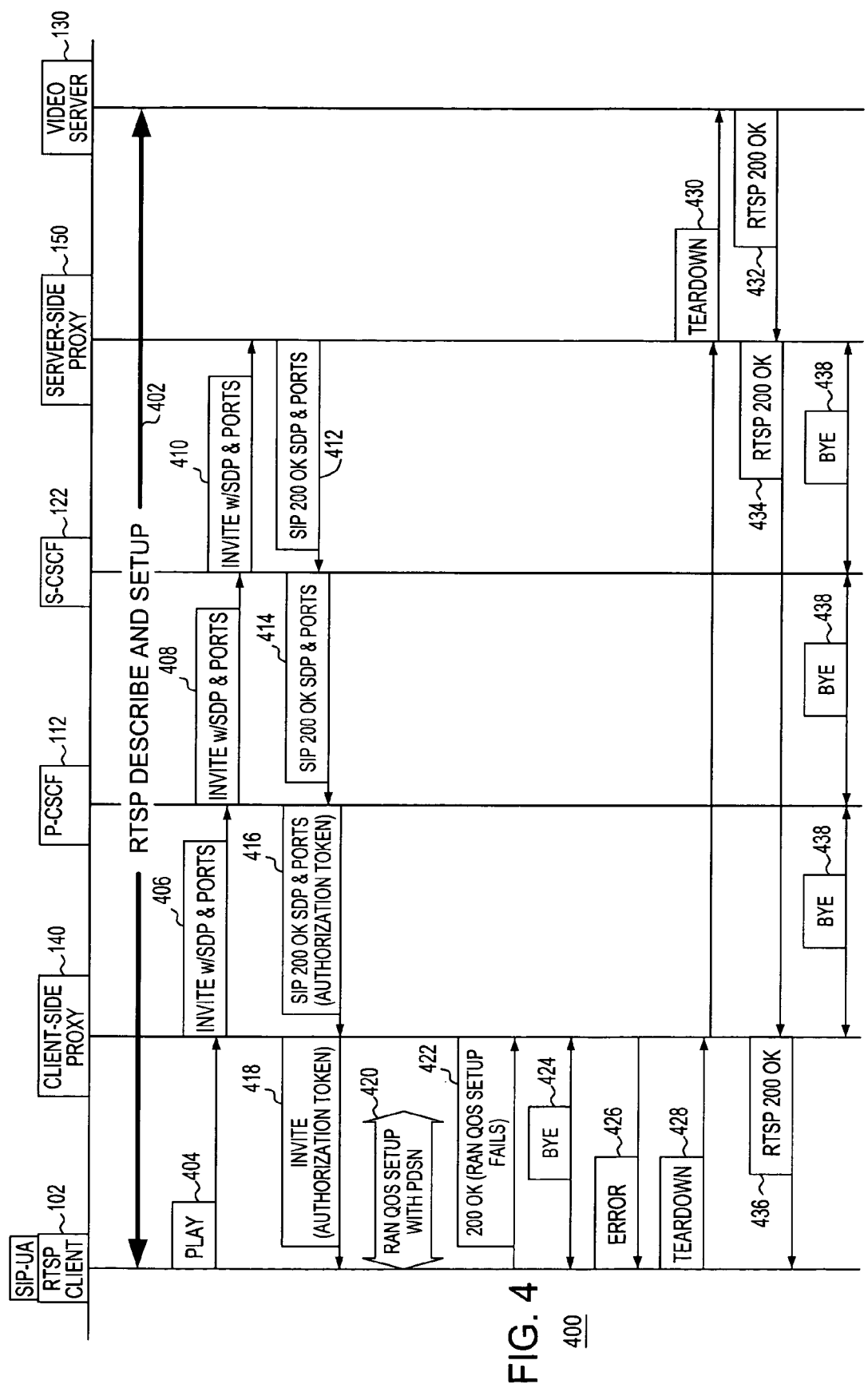
FIG. 4 depicts a call flow diagram according to one embodiment of the invention in which service endpoints attempt to utilize a network service.

In one embodiment, the authorization token specifies at least one authorized QOS parameter associated with the requested RTSP session. In one embodiment, CSP 140 compares the authorized QOS from the authorization token with the declared QOS (i.e., QOS declared by VS 130 using RTSP SDP messaging). If the authorized QOS associated with the authorization token is greater than or equal to the declared QOS communicated by VS 130 using RTSP SDP, IMS QOS authentication succeeds and CSP 140 triggers WT 102 to initiate RAN QOS setup processing (as depicted in FIG. 4). As depicted in FIG. 3 (at step 317), however, the authorized QOS associated with the authorization token is less than the declared QOS communicated by VS 130 using RTSP SDP and, as such, IMS QOS authentication fails.

As such, at step 318, CSP 140 terminates the RTSP session by generating an RTSP ERROR message and transmitting the RTSP ERROR message to WT 102. The RTSP ERROR message is transmitted by CSP 140 in response to the RTSP PLAY message transmitted by WT 102 and held by CSP 140 during QOS validation. For example, in one embodiment, any RTSP ERROR message comprising an error code between 400 and 500 may be used. For example, an error message of 412 PRECONDITION FAILED comprises an appropriate error message. Upon receiving the RTSP ERROR message, WT 102 initiates a RTSP TEARDOWN message. As such, steps 320-330 of FIG. 3 are substantially similar to steps 252-262 depicted and described with respect to FIG. 2.

FIG. 4 depicts a call flow diagram according to one embodiment of the invention. Specifically, call flow diagram 400 of FIG. 4 comprises a call flow for enabling service endpoints to ensure QOS in a manner transparent to the service endpoints. As depicted in FIG. 4, call flow diagram 400 of FIG. 4 is described within the context of communication network architecture 100 of FIG. 1. As such, although not depicted, L4/7-S 142 and L4/7-S 152 are used for redirecting communications associated with CSP 140 and SSP 150, respectively, as depicted and described herein with respect to FIG. 1.

At least a portion of call flow diagram 400 of FIG. 4 is substantially similar to call flow diagram 200 of FIG. 2. Furthermore, although a portion of the steps are depicted as being performed serially, those skilled in the art will appreciate that at least a portion of the steps of method 400 may be performed contemporaneously, as well as in a different order than presented in FIG. 4. The call flow diagram 400 is initiated in response to a request by a service endpoint (illustratively, WT 102) to establish a connection with another service endpoint (illustratively, VS 130) for exchanging information. As such, as depicted in FIG. 4, call flow diagram 400 of FIG. 4 begins at step 402.

At steps 402-416, RTSP message communications/processing and SIP message communications/processing is performed. In one embodiment, RTSP DESCRIBE/SETUP message communications/processing and SIP INVITE/SDP message communications/processing of steps 402-416 is performed in a manner substantially similar to RTSP DESCRIBE/SETUP message communications/processing and SIP INVITE/SDP message communications/processing performed in steps 302-316 depicted and described herein with respect to FIG. 3. As depicted in FIG. 4, the authorized QOS associated with the authorization token is greater than or equal to the declared QOS communicated by VS 130 using RTSP SDP. As such, IMS QOS authentication succeeds and CSP 140 triggers WT 102 to initiate RAN QOS setup processing.

As depicted in FIG. 4, the authorized QOS associated with the authorization token is greater than or equal to the declared QOS communicated by VS 130 using RTSP SDP. As such, at step 418, IMS QOS authentication succeeds and CSP 140 triggers WT 102 to initiate RAN QOS setup processing. In one embodiment, CSP 140 triggers WT 102 to begin RAN QOS processing by transmitting a SIP INVITE message to the SIP-UA portion of WT 102. In one embodiment, the SIP INVITE message initiated by CSP 140 is generated such that the ALERT-INFO field is set to <blank> in order to prevent WT 102 from ringing (i.e., WT 102 may confuse the SIP INVITE initiated by CSP 140 with a SIP INVITE initiated by another WT attempting to call WT 102).

Figure 5:
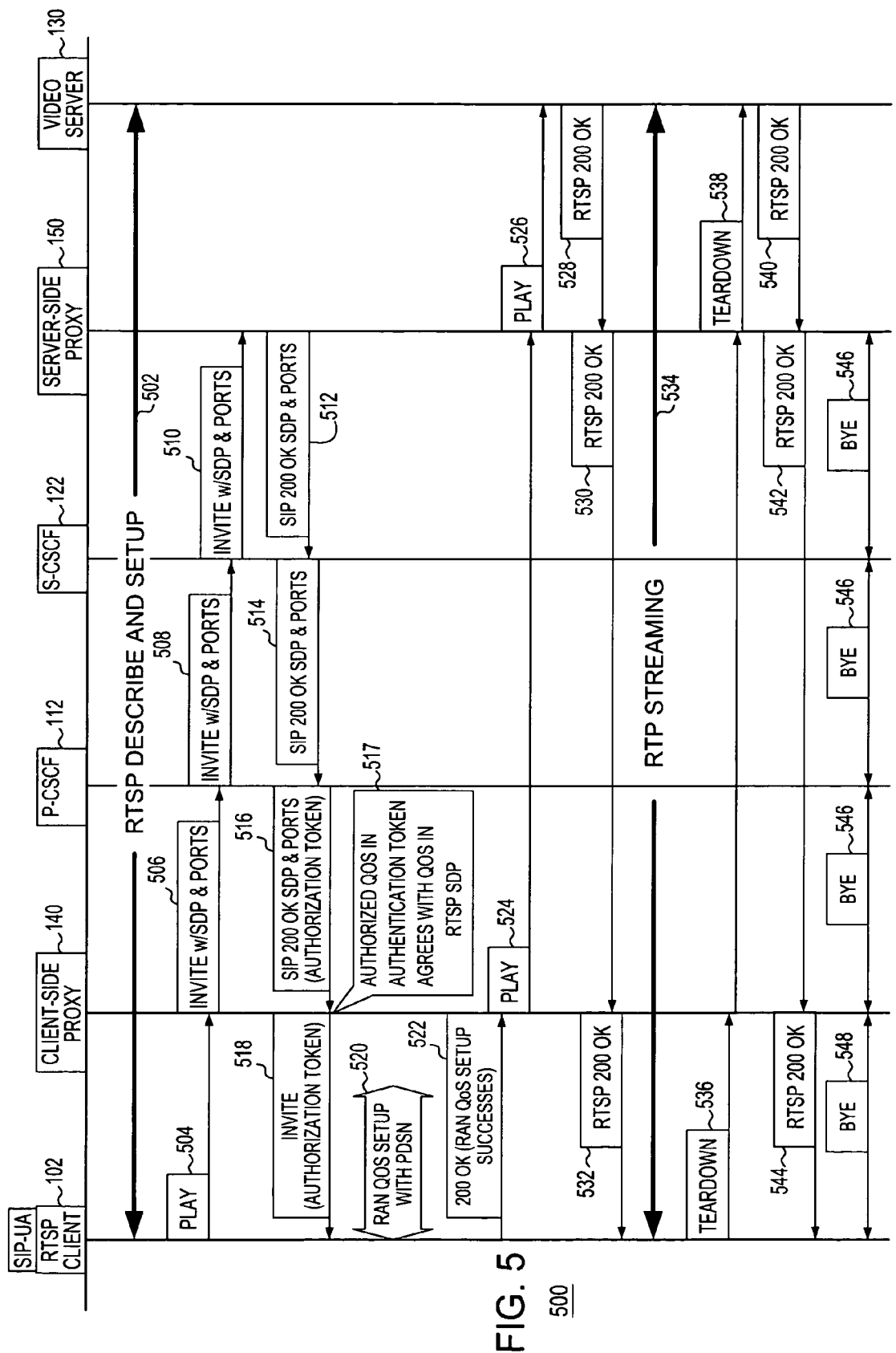
FIG. 5 depicts a call flow diagram according to one embodiment of the invention in which service endpoints attempt to utilize a network service.

At step 420, RAN QOS setup communications/processing is performed between WT 102 and SN 106. In one embodiment, the SIP-UA client portion of WT 102 processes the authorization token generated by P-CSCF 112 for use in RAN QOS setup processing between WT 102 and the SN 106. The SIP-UA client portion of WT 102 informs the SIP-proxy portion of CSP 140 of the outcome of the RAN QOS setup procedure. If the RAN QOS setup procedure is successful (as depicted in FIG. 5), the SIP-proxy portion of CSP 140 forwards the RTSP PLAY message toward VS 130. As depicted in FIG. 4, however, the RAN QOS setup procedure is unsuccessful and, as such, at step 422, the SIP-proxy portion of CSP 140 returns an error message to WT 102 in order to terminate the RTSP session between WT 102 and VS 130.

At step 424, a SIP BYE message is exchanged between WT 102 and CSP 140. At step 426, CSP 140 transmits a RTSP ERROR message to WT 102 in response to the SIP BYE message exchange. At step 428, CSP 140 terminates the RTSP session by generating an RTSP ERROR message and transmitting the RTSP ERROR message to WT 102. The RTSP ERROR message is transmitted by CSP 140 in response to the RTSP PLAY message transmitted by WT 102 and held by CSP 140 during QOS validation. Upon receiving the RTSP ERROR message, WT 102 initiates a RTSP TEARDOWN message. As such, steps 428-438 of FIG. 4 are substantially similar to steps 320-330 depicted and described with respect to FIG. 3.

FIG. 5 depicts a call flow diagram according to one embodiment of the invention. Specifically, call flow diagram 500 of FIG. 5 comprises a call flow for enabling service endpoints to ensure QOS in a manner transparent to the service endpoints. As depicted in FIG. 5, call flow diagram 500 of FIG. 5 is described within the context of communication network architecture 100 of FIG. 1. As such, although not depicted, L4/7-S 142 and L4/7-S 152 are used for redirecting communications associated with CSP 140 and SSP 150, respectively, as depicted and described herein with respect to FIG. 1.

At least a portion of call flow diagram 500 of FIG. 5 is substantially similar to call flow diagram 200 of FIG. 2. Furthermore, although a portion of the steps are depicted as being performed serially, those skilled in the art will appreciate that at least a portion of the steps of method 500 may be performed contemporaneously, as well as in a different order than presented in FIG. 5. The call flow diagram 500 is initiated in response to a request by a service endpoint (illustratively, WT 102) to establish a connection with another service endpoint (illustratively, VS 130) for exchanging information. As such, as depicted in FIG. 5, call flow diagram 500 of FIG. 5 begins at step 502.

At steps 502-520, RTSP/SIP message communications/processing and RAN QOS communications/processing is performed. In one embodiment, RTSP/SIP message communications/processing and RAN QOS communications/processing of steps 502-520 is performed in a manner substantially similar to RTSP/SIP message communications/processing and RAN QOS communications/processing performed in steps 402-420 depicted and described herein with respect to FIG. 4. As depicted in FIG. 5, however, RAN QOS setup processing between WT 102 and SN 106 is successful. As such, at step 522, WT 102 initiates a SIP 200 OK message (i.e., a RAN QOS setup success) to CSP 140.

Upon receiving the SIP 200 OK message, CSP 140 releases the RTSP PLAY message for transmission towards VS 130. In one embodiment, subsequent RTSP PLAY/OK message communications/processing, RTP streaming, and RTSP TEARDOWN message communications/processing of steps 524-546 is performed in a manner substantially similar to RTSP PLAY/OK message communications/processing, RTP streaming, and RTSP TEARDOWN message communications/processing performed in steps 240-262 depicted and described with respect to FIG. 2. At step 548, which may be performed contemporaneously with step 546, SIP BYE messages are exchanged between CSP 140 and the SIP-client portion of WT 102.

Although primarily described herein with respect to communications between a wireless caller device and a network server device, the present invention may be used for facilitating communications between various other combinations of service endpoints. In one embodiment, for example, the present invention is used for supporting peer-to-peer communications between network-based devices. In one embodiment, for example, the present invention may be used for supporting peer-to-peer communications between a caller device and a callee device. In another embodiment, for example, the present invention is used for supporting peer-to-peer communications between numerous caller/callee devices.

Although primarily described herein with respect to an embodiment in which at least one base protocol message associated with one base protocol is used for generating at least one companion protocol message associated with one companion protocol, those skilled in the art will appreciate that other combinations of base protocols and associated base protocol messages may be used for generating various combinations of companion protocol messages associated with various companion protocols. Furthermore, various other combinations of base protocols and associated base protocol messages and companion protocols and associated companion protocol messages may be used for controlling one or more network services.

In one embodiment, one base protocol message may be used for generating one companion protocol message. In another embodiment, a plurality of base protocol messages may be used for generating one companion protocol message. In one such embodiment, the plurality of base protocol messages is formatted in accordance with one base protocol. In another such embodiment, the plurality of base protocol messages is formatted in accordance with a plurality of base protocols. In such embodiments, the companion protocol message may be used for controlling one network service. Similarly, in such embodiments, the companion protocol message may be used for controlling a plurality of network services.

In one embodiment, one base protocol message may be used for generating a plurality of companion protocol messages. In another embodiment, a plurality of base protocol messages may be used for generating a plurality of companion protocol messages. In one embodiment, the plurality of companion protocol messages is formatted in accordance with one companion protocol. In another embodiment, the plurality of companion protocol messages is formatted in accordance with a plurality of companion protocols. In such embodiments, the plurality of companion protocol messages may be used for controlling one network service. Similarly, in such embodiments, the plurality of companion protocol messages may be used for controlling a plurality of network services.

In one embodiment, at least one base protocol message formatted in accordance with at least one base protocol is used for generating at least one companion protocol message formatted in accordance with at least one companion protocol. As such, the regenerative signaling functionality of the present invention is independent of the number of base protocols and companion protocols. Similarly, the regenerative signaling functionality of the present invention is independent of the number of base protocol messages and the number of companion protocol messages. Furthermore, various combinations of base protocols and associated base protocol messages and companion protocols and associated companion protocol messages may be used for controlling any number of network services.

Furthermore, although primarily described herein with respect to a RTSP based protocol and a SIP companion protocol, in one embodiment, any protocol may be used as the base protocol and any protocol may be used as a companion protocol. For example, in one embodiment, SIP is used as the base protocol, and RTSP is used as the companion protocol. For example, in another embodiment, HTTP is used as the base protocol and SIP is used as the companion protocol. Similarly, for example, in another embodiment, HTTP and RTSP are used as base protocols and SIP is used as a companion protocol. As such, the regenerative signaling functionality of the present invention is independent of base protocol and companion protocol and is not intended to be limited to the protocols of the exemplary scenarios described herein.

In one embodiment, at least one FSM is maintained for each of at least one base protocol. In one such embodiment, the at least one base protocol FSM is operable for managing at least one base protocol message. For example, in one embodiment, at least a portion of the base protocol messages are mapped into associated base protocol FSM states. Similarly, in one embodiment, at least one FSM is maintained for at least one companion protocol. In one such embodiment, the at least one companion protocol FSM is operable for managing at least one companion protocol message formatted in accordance with the at least one companion protocol. For example, in one embodiment, at least a portion of the companion protocol messages are mapped into associated companion protocol FSM states.

In one further embodiment, the at least one base protocol FSM and the at least one companion protocol FSM are synchronized. In one embodiment, synchronization of the base protocol FSMs and the companion protocol FSMs is performed in a manner tending to enable utilization of at least one network service in a manner substantially transparent to at least one service endpoint. In one embodiment, at least a portion of the base protocol messages and at least a portion of the companion protocol messages are used for controlling state transitions of the base protocol FSMs and the companion protocol FSMs, respectively. In one embodiment, the finite state machines are maintained on at least one of CSP 140 or SSP 150, or various combinations thereof.

It is contemplated that at least a portion of the described functions may be combined into fewer functional elements. Similarly, it is contemplated that various functions may be performed by other functional elements, or that the various functions may be distributed across the various functional elements in a different manner. For example, at least a portion of the functions described herein with respect to CSP 140 and SSP 150 may be performed by L4/7-S 142 and L4/7-S 152, respectively. Similarly, for example, at least a portion of the functions described herein with respect to L4/7-S 142 and L4/7-S 152 may be performed by CSP 140 and SSP 150, respectively. Furthermore, although primarily described herein with respect to an IMS network architecture, those skilled in the art will appreciate that the methodologies of the present invention may be used to perform regenerative signaling in various other networks.

Figure 6:
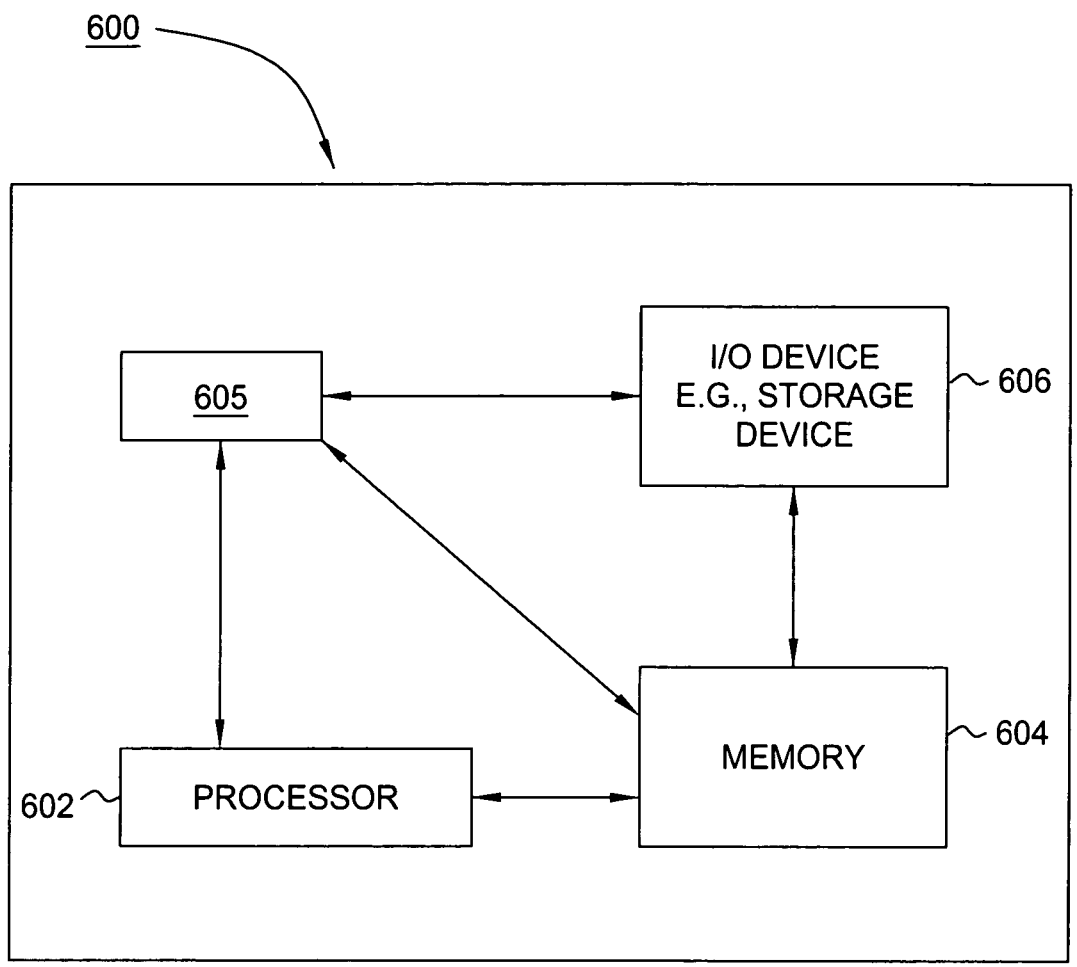
FIG. 6 depicts a high-level block diagram of a general purpose computer suitable for use in performing the functions described herein.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a regenerative signaling module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present regenerative signaling module or process 605 can be loaded into memory 604 and executed by processor 602 to implement the functions as discussed above. As such, regenerative signaling process 605 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method, comprising:
receiving, at a proxy associated with one or more service endpoints, a plurality of base protocol messages formatted in accordance with a plurality of base protocols, said plurality of base protocol message messages associated with said one or more service endpoints;
obtaining, using said plurality of base protocol messages, service information associated with at least one network service; and
generating, in response to said plurality of base protocol messages, a plurality of companion protocol messages formatted in accordance with a companion protocol, wherein corresponding proxies are adapted to proxy the plurality of base protocol messages for transmission towards respective service endpoints and at least one of said proxies is operable for generating or terminating at least one companion protocol message to render companion protocol messaging transparent to the service end point;
said at least one companion protocol message generated using at least a portion of said service information;
said at least one companion protocol message operable for controlling said at least one network service in a manner transparent to said service endpoint.

2. The method of claim 1, further comprising:
maintaining a first finite state machine for said base protocol, said first finite state machine operable for managing a corresponding base protocol message;
maintaining a second finite state machine for said companion protocol, said second finite state machine operable for managing a corresponding companion protocol message; and
synchronizing said first finite state machine for said base protocol and said second finite state machine for said companion protocol.

3. The method of claim 2, wherein said synchronizing is performed in a manner enabling utilization of said at least one network service in a manner transparent to said service endpoint.

4. The method of claim 1, further comprising:
transmitting said at least one companion protocol message towards at least one remote system, said at least one remote system operable for terminating said at least one companion protocol message in a manner rendering said at least one companion protocol message transparent to at least one other service endpoint.

5. The method of claim 4, further comprising:
receiving, at said at least one remote system, said at least one companion protocol message;
terminating said at least one companion protocol message; and
generating at least one companion protocol response message formatted in accordance with said companion protocol, said at least one companion protocol response message operable for controlling said at least one network service in a manner transparent to said service endpoint.

6. The method of claim 1, further comprising:
forwarding said at least one base protocol message formatted in accordance with said base protocol towards another service endpoint.

7. The method of claim 6, wherein said service endpoint comprises at least one caller device and said another service endpoint comprises at least one callee device.

8. The method of claim 1, wherein said base protocol and said companion protocol comprise at least one of a Session Initiation Protocol (SIP), a Real Time Streaming Protocol (RTSP), or a Hypertext Transfer Protocol (HTTP).

9. An apparatus, comprising:
means for receiving, at a proxy associated with one or more service endpoints a plurality of base protocol messages formatted in accordance with a plurality of base protocols, said plurality of base protocol messages associated with said one or more service endpoints;

means for obtaining, using said plurality of base protocol messages, service information associated with at least one network service; and means for generating, in response to said plurality of base protocol messages, a plurality of companion protocol messages formatted in accordance with a companion protocol, wherein corresponding proxies are adapted to proxy the plurality of base protocol messages for transmission towards respective service endpoints and at least one of said proxies is operable for generating or terminating at least one companion protocol message to render companion protocol messaging transparent to the service end point;

said at least one companion protocol message generated using at least a portion of said service information;

said at least one companion protocol message operable for controlling said at least one network service in a manner transparent to said service endpoint.

10. The apparatus of claim 9, further comprising:

means for maintaining a first finite state machine for said base protocol, said first finite state machine operable for managing a corresponding base protocol message;

means for maintaining a second finite state machine for said companion protocol, said second finite state machine operable for managing a corresponding companion protocol message; and means for synchronizing said first finite state machine for said base protocol and said second finite state machine for said companion protocol.

11. The apparatus of claim 10, wherein said means for synchronizing is operable for enabling utilization of said at least one network service in a manner transparent to said service endpoint.

12. The apparatus of claim 9, further comprising:

means for transmitting said at least one companion protocol message towards a remote system, said remote system operable for terminating said at least one companion protocol message in a manner rendering said at least one companion protocol message transparent to at least one other service endpoint.

13. The apparatus of claim 12, further comprising:

means for receiving, at said remote system, said at least one companion protocol message;

means for terminating said at least one companion protocol message; and means for generating at least one companion protocol response message formatted in accordance with said companion protocol, said at least one companion protocol response message operable for controlling said at least one network service in a manner transparent to said at least one service endpoint.

14. The apparatus of claim 9, further comprising:

means for forwarding said at least one base protocol message formatted in accordance with said base protocol towards another service endpoint.

15. The apparatus of claim 14, wherein said service endpoint comprises at least one caller device and said another service endpoint comprises at least one callee device.

16. The apparatus of claim 9, wherein said base protocol and said companion protocol comprise at least one of a Session Initiation Protocol (SIP), a Real Time Streaming Protocol (RTSP), or a Hypertext Transfer Protocol (HTTP).

17. A method, comprising:

receiving, at a proxy associated with one or more service endpoints, a plurality of companion protocol messages formatted in accordance with a plurality of companion protocols, said plurality of companion protocol messages generated in response to at least one base protocol message formatted in accordance with a plurality of base protocols wherein when the base protocols are identical to the companion protocols, corresponding proxies are adapted to proxy base protocol messages for transmission towards respective service endpoints and at least one of said proxies is operable for generating or terminating at least one companion protocol message to render companion protocol messaging transparent to the service end point;

said at least one companion protocol message generated using at least a portion of service information obtained from said at least one base protocol message, said service information associated with a network service;

said at least one companion protocol message operable for controlling said network service in a manner transparent to at least one service endpoint associated with said at least one base protocol message.

18. The method of claim 17, further comprising:

terminating said at least one companion protocol message; and generating at least one companion protocol response message formatted in accordance with said companion protocol;

said at least one companion protocol response message generated using at least one of said at least one base protocol message or said at least one companion protocol message;

said at least one companion protocol response message operable for controlling said network service in a manner transparent to said service endpoint associated with said at least one base protocol message.

19. The method of claim 17, further comprising:

maintaining a first finite state machine for each of said at least one base protocol, said first finite state machine operable for managing a corresponding base protocol message;

maintaining a second finite state machine for each of said at least one companion protocol, said second finite state machine operable for managing a corresponding companion protocol message; and synchronizing said first finite state machine for each of said at least one base protocol and said second finite state machine for each of said at least one companion protocol.

20. The method of claim 19, wherein said synchronizing is performed in a manner enabling utilization of said at least one network service in a manner transparent to said service endpoint.

21. The method of claim 17, further comprising:

receiving said at least one base protocol message; and forwarding said at least one base protocol message towards another service endpoint.

22. The method of claim 21, wherein said service endpoint comprises at least one caller device and said another service endpoint comprises at least one callee device.

23. The method of claim 17, wherein said base protocol and said companion protocol comprise at least one of a Session Initiation Protocol (SIP), a Real Time Streaming Protocol (RTSP), or a Hypertext Transfer Protocol (HTTP).

24. A method for processing a request for receiving streaming video content, comprising:

receiving, at a proxy associated with one or more service endpoints, a plurality of base protocol messages formatted in accordance with a plurality of base protocols, said plurality of base protocol messages associated with said one or more service endpoints;

obtaining, using said plurality of base protocol messages, service information associated with at least one network service; and generating, in response to said plurality of base protocol messages, a plurality of companion protocol messages formatted in accordance with a companion protocol, wherein corresponding proxies are adapted to proxy the plurality of base protocol messages for transmission towards respective service endpoints and at least one of said proxies is operable for generating or terminating at least one companion protocol message to render companion protocol messaging transparent to the service end point; said at least one companion protocol message generated using at least a portion of said information associated with said streaming video service;

said at least one companion protocol message operable for configuring, in a manner transparent to said service endpoint, at least one network element for supporting streaming of said streaming video content to said service endpoint.

* * * * *